US012035652B2

(12) United States Patent
Reichhardt

(10) Patent No.: US 12,035,652 B2
(45) Date of Patent: Jul. 16, 2024

(54) DEVICE FOR MOUNTING A SUPPORT ARM, WHICH MOVES A LIFTING TOOL, ON A HARVESTING MACHINE

(71) Applicant: Reichhardt GmbH Steuerungstechnik, Hungen (DE)

(72) Inventor: Andreas Reichhardt, Hungen (DE)

(73) Assignee: Reichhardt GmbH Steuerungstechnik, Hungen (DE)

( * ) Notice: Subject to any disclaimer, the term of this patent is extended or adjusted under 35 U.S.C. 154(b) by 578 days.

(21) Appl. No.: 17/335,282

(22) Filed: Jun. 1, 2021

(65) Prior Publication Data

US 2021/0378169 A1 Dec. 9, 2021

(30) Foreign Application Priority Data

Jun. 4, 2020 (DE) .................... 10 2020 114 915.8

(51) Int. Cl.
*A01D 33/14* (2006.01)
*A01D 25/00* (2006.01)
*A01D 27/00* (2006.01)
*A01D 33/00* (2006.01)
*A01D 33/02* (2006.01)

(52) U.S. Cl.
CPC ........... *A01D 33/14* (2013.01); *A01D 25/005* (2013.01); *A01D 27/00* (2013.01); *A01D 33/00* (2013.01); *A01D 33/02* (2013.01)

(58) Field of Classification Search
CPC ........ A01D 33/00; A01D 33/02; A01D 33/14; A01D 25/005; A01D 25/04; A01D 27/00
See application file for complete search history.

(56) References Cited

U.S. PATENT DOCUMENTS

| | | | | | |
|---|---|---|---|---|---|
| 2,897,900 | A | * | 8/1959 | Huddle ................. | A01D 17/10 171/126 |
| 3,454,099 | A | * | 7/1969 | Wells .................... | A01D 25/04 171/58 |
| 3,548,951 | A | * | 12/1970 | Weimer et al. ........ | A01D 17/00 171/61 |
| 3,548,952 | A | * | 12/1970 | Carhart ................. | A01D 19/00 171/95 |
| 3,743,024 | A | * | 7/1973 | Mayo et al. ......... | A01D 25/048 171/25 |
| 6,478,548 | B1 | * | 11/2002 | Auer .................... | F04B 49/125 417/221 |
| 6,882,960 | B2 | * | 4/2005 | Miller ................... | F04B 51/00 702/182 |

(Continued)

FOREIGN PATENT DOCUMENTS

| | | |
|---|---|---|
| DE | 24 40 893 A1 | 7/1975 |
| DE | 77 13 730 U1 | 7/1980 |

(Continued)

*Primary Examiner* — Thomas B Will
*Assistant Examiner* — Joel F. Mitchell
(74) *Attorney, Agent, or Firm* — Collard & Roe, P.C.

(57) ABSTRACT

In the case of a mounting device for mounting a support arm, which moves a lifting tool, on a harvesting machine, a cylindrical bushing is mounted on a machine part. The bushing is enclosed by a retaining element on which the end of the support arm opposite the lifting tool is fixed. The bushing has a through-hole that receives a machine part and has an axis of symmetry extending eccentrically relative to the axis of rotation of the cylindrical bushing.

14 Claims, 3 Drawing Sheets

(56) References Cited

U.S. PATENT DOCUMENTS

| | | | |
|---|---|---|---|
| 8,322,997 B2* | 12/2012 | Auer et al. | F04B 1/07 92/72 |
| 2017/0172061 A1* | 6/2017 | Borgmann et al. | A01D 25/04 |

FOREIGN PATENT DOCUMENTS

| | | | | |
|---|---|---|---|---|
| DE | 92 09 145 U1 | | 11/1992 | |
| DE | 199 49 644 A1 | | 4/2001 | |
| DE | 10 2004 041 970 B4 | | 3/2008 | |
| EP | 0 930 001 A1 | | 7/1999 | |
| GB | 1 473 711 A | | 5/1977 | |
| SU | 886794 A1 | * | 12/1981 | A01D 25/04 |

* cited by examiner

DEVICE FOR MOUNTING A SUPPORT ARM, WHICH MOVES A LIFTING TOOL, ON A HARVESTING MACHINE

CROSS REFERENCE TO RELATED APPLICATIONS

Applicant claims priority under 35 U.S.C. § 119 of German Patent Application No. 10 2020 114 915.8 filed June 4, 2020.

FIELD OF THE INVENTION

The invention relates to a mounting device for mounting a support arm, which moves a lifting tool, on a harvesting machine, comprising a cylindrical bushing mounted on a machine part. The invention also relates to a harvesting machine for harvesting root crops having a mounting device and to a method for controlling the mounting device.

BACKGROUND OF THE INVENTION

Devices for digging up tuberous or root crops, such as potatoes or beets, have the task of pulling up the crops from the ground and simultaneously freeing them from adhering soil. The ploughshares are usually moved in the same direction or relative to each other by means of an eccentric or crank drive.

Root crop harvesting machines of the type specified are described in the prior art. DE 92 09 145 U1 describes a harvesting machine in which digging units are attached to an intermediate frame via a link, the intermediate frame being linked to the frame of the harvesting machine so as to be movable via a pendulum frame. Ground adaptation is achieved via the pendulum movement of the digging units.

DE 77 13 730 U1 describes a root crop harvesting machine having pairs of shares arranged on a common shaft, the shaft being arranged transversely to the direction of travel of the machine and an eccentric rotating along with the shaft being provided for each pair of shares, which eccentric is rotatably mounted in a cylindrical bushing of the shares. Each pair of shares can be displaced relative to the common shaft.

DE 24 40 893 A1 discloses a root crop digging device in which the ploughshares are displaceably mounted so as to yield on a common beam transversely to the direction of travel via leaf springs.

Furthermore, DE 199 49 644 A1 describes a root crop harvesting machine having a parallelogram suspension of a support arm to which a share carrier is pivotably attached via a joint. One end of the share carrier is connected to a fixed crossbeam of the machine via a connecting rod. The penetration depth of the digging tools is determined by an angle encoder and controlled by a control device. It is possible to raise the support arm if the digging tools hit an obstacle.

A root crop harvesting machine having a row of height-adjustable digging units arranged transversely to the direction of travel is known from DE 10 2004 041 970 B4. Each digging unit consists of a pair of ploughshares that are pivotably attached to a transverse axis. The transverse axis is in turn arranged between two side walls of the frame. Each digging unit forms an articulation point of a four-bar linkage that is pivotably mounted on the associated transverse axis by means of rockers.

A device for digging up root crops is known from EP 0 930 001 A1 that has a drive having a driven shaft and an eccentric unit arranged on the shaft for generating an oscillating movement of the ploughshares. Each individual share holder is displaced linearly on a common shaft and set into an oscillating motion.

Due to unevenness on the ground or changing harvesting or digging conditions for the root crops, it is often necessary to adjust the ploughshares, for example to change the working height or the distance between the ploughshares, thereby avoiding damage to the root crops. The disadvantage of the known devices and the known harvesting machines is that the digging instruments can only be moved in all spatial directions by means of complex suspensions and bearings, which complicates control of the digging instruments and the harvesting machine. In addition, the previous solutions are cost-intensive and complex to maintain.

The invention is based on the object of providing means that allow the ploughshares to be easily and flexibly adjusted to unevenness, such that they are designed to be movable in different spatial directions.

The object is achieved according to the invention in that a mounting device is provided for mounting a support arm, which moves a lifting tool, on a harvesting machine having a cylindrical bushing that is enclosed by a retaining element on which the end of the support arm opposite the lifting tool is fixed, the bushing having a through-hole receiving a machine part having an axis of symmetry extending eccentrically relative to the axis of rotation of the cylindrical bushing, the axis of symmetry extending at an angle a to the axis of rotation and intersecting said axis of rotation at an intersection point. A mounting device which is simple and inexpensive to manufacture is provided for mounting a support arm having a lifting tool. With the help of the mounting device, the position of the support arm and, consequently, that of the lifting tool can be easily adjusted and adapted to the position of the root crops to be lifted in a field by rotating the bushing relative to the machine part. As a result, the lifting tool can also be adapted in a simple manner to the spacing of the root crops grown in rows, an individual adaptation of the support arms being possible here. This means that each support arm mounted on a mounting device can be adjusted individually. This is particularly advantageous when numerous lifting tools are arranged on a harvesting machine and said lifting tools are to be guided out of phase with one another, for example.

The angle a at which the axis of symmetry of the hole can be in relation to the axis of rotation can be configured differently, an angle within a range of up to 1° to 75° being advantageous. The through-hole is introduced into the cylindrical bushing in such a way that the axis of symmetry of the through-hole intersects the axis of rotation of the cylindrical bushing. The intersection point of the axes resulting from the alignment of the through-hole shifts depending on the position of the through-hole in the bushing. The scope and extent of the movement carried out by the support arm or the lifting tool can be defined based on the design of the through-hole, i.e. the angle at which it is present in the bushing and where the intersection point is consequently located. Depending on the distance between the support arm having the lifting tool and the intersection point, the movement carried out is more extensive or less extensive. This allows the penetration depth of the lifting tool to be easily adapted to the respective crop to be lifted. In addition, mounting devices with corresponding through-holes can be provided for different applications, which through-holes are adapted to the respective application.

The support arm and, consequently, the lifting tool can be positioned with the aid of an adjustment means that engages the retaining means or the bushing and, for example, rotates the bushing on the machine part. By rotating the bushing, the support arm is adjusted in different spatial directions. The support arm can be moved in an elliptical or circular path transversely to the axis of rotation, i.e. in an up and down movement. On the other hand, the support arm is guided in a pendulum movement in the axial direction along the axis of rotation. In addition, the lifting tool can move back and forth transversely to the axis of rotation.

The mounting device according to the invention is robust and not susceptible to failure. In addition, the functionality of the mounting device is not impaired by dirt. In the known solutions, penetrating dirt often leads to an impairment of the adjustability because the dirt settles in the joints necessary for the movement. In the device according to the invention, the penetration of dirt is largely prevented and, moreover, has no influence on the adjustability of the mounting device because the adjustment is only achieved by rotating the bushing, for example. The mounting device which is simply constructed and inexpensive to manufacture simplifies the positioning of the lifting tools and simultaneously increases the range of freedom of movement such that root crops can be extracted efficiently and gently from the ground.

It is proposed that the through-hole has two openings, and at least one centre point of an opening is arranged offset to the axis of rotation of the cylindrical bushing. The centre of the second opening can be arranged in alignment with the axis of rotation such that the axis of symmetry of the through-hole intersects the axis of rotation at the intersection point.

To expand the possibilities for positioning the support arm and, consequently, the lifting tool, one embodiment provides for the retaining element to be mounted in an axially displaceable manner on the bushing. The position of the retaining element can be varied relative to the bushing. Depending on the position of the retaining element relative to the bushing, the position of the lifting tool can be changed. An axial displacement of the retaining element can be realised with the aid of a displacement means that is fixed on the retaining element. Furthermore, it can be provided that a sleeve is arranged between the bushing and the retaining element, which sleeve encloses the bushing. The sleeve can be adjustably mounted on the bushing and can be displaced or rotated with the aid of adjustment or displacement means.

It is also advantageous that the bushing is mounted in an axially displaceable manner on the machine part. By displacing the bushing, the position of the support arm and, consequently, of the lifting tool can be changed. This can be advantageous, for example, if the lifting tool has to be aligned with the root crops grown in rows. The displacement can take place with the aid of a displacement means that is fixed on the bushing.

In one embodiment, an adjustment means that rotates the bushing and/or the retaining element can be arranged on the bushing and/or the retaining element. The retaining element can be aligned on the bushing and/or the bushing can be positioned on the machine part manually or automatically. The displacement means, but also the adjustment means, can be designed in a simple manner as levers such that manual actuation is possible. However, automatic displacement or adjustment may also be preferred, which can be done by means of an electric motor, for example.

It is proposed that the retaining element is designed in such a way that it is divided and that both parts are arranged on the bushing such that they can be axially displaced independently of one another. At least one support arm having a lifting tool can be attached to a retaining element. However, it can also be advantageous for the retaining element to be designed in such a way that it is divided and for both parts of the retaining element to be on a bushing, one support arm having a lifting tool being attached to each retaining element. The retaining element can also be designed in the form of a band. In a preferred embodiment, it is provided that at least one further support arm is mounted on the non-divided retaining element and the support arms are rotatable relative to each other in their mounts and thus the lifting movements are adjustable relative to each other or in the same direction.

In a further aspect, the invention relates to a harvesting machine for harvesting root crops having a previously described mounting device, to a mobile frame and to at least one lifting tool that is movably mounted on the mounting device via a support arm. The harvesting machine can have its own drive and thus be designed to be self-propelled. The harvesting machine can, however, also be provided as a trailer or attachment and have no drive of its own, it being possible for the lifting tools to be driven by a power take-off. In particular, the harvesting machine has a multiplicity of lifting tools arranged in several rows relative to one another, which lifting tools are arranged on mounting devices such that efficient harvesting is possible. A tool can advantageously be provided on the harvesting machine for removing heads from root crops. Before the root crops are removed from the ground by the lifting tools, the head of the root crop is removed together with the leaves by means of a cutting tool. It is also preferred that a tool is provided for picking up and further processing the root crops lifted up by the lifting tool. The root crop can be conveyed into a storage chamber in the harvesting machine by a conveyor, for example a conveyor belt or a worm drive.

The lifting tool can be a digging instrument such as a ploughshare, a wheel ploughshare or a polder share, with the help of which root crops such as beets, chicory, beetroot or potatoes are lifted out of the ground. Polder shares, also known as oscillating or winged shares, can be wing-shaped plates arranged in pairs that can be moved up and down simultaneously or in a phase-shifted manner by means of an embodiment of the device according to the invention. The pair of shares can be arranged, for example, in an oblique V-shape, with the tip pointing downwards to the rear. Additional oscillation can allow particularly gentle lifting and simultaneously prevent soil and leaves from adhering. Wheel ploughshares can be designed as wheels arranged in pairs in a V-shape, at least one of which, in a preferred embodiment, is driven. In one embodiment, a rigid share can also be used instead of the second wheel. It can also be advantageous if the mounting device can be connected to an eccentric such that an additional movement or movement direction can be realised.

It may be preferred that a plurality of mounting devices are provided in a harvesting machine and at least one support arm having a lifting tool is arranged on each mounting device. Advantageously, the lifting tool designed as a ploughshare can have individually height-adjustable oscillating shares such that, for example, the height difference between individual rows (tracks or furrows) can be compensated for.

The invention also relates to a method for adjusting a mounting device, in which the bushing, the sleeve and/or the retaining element is or are automatically or manually displaced or adjusted relative to the machine part.

It can be advantageous that the position of the bushing, the sleeve and/or the retaining element relative to the machine part is detected by sensors and transmitted to an evaluation unit and, based on an evaluation of the measured values recorded by the sensors, an automatic or manual change in the position of the bushing, the sleeve and/or the retaining element relative to the machine part may be carried out by means of adjustment or displacement means.

Furthermore, sensors can be provided that, for example, record the travel speed, inclination of the axles, digging depth, fill level of the ploughshares, topper position, fill level of the belts, oscillating share speed, bladed rotor power, machine power requirement, motor, hydraulics, share resistance, power, bladed rotor speed, height, oscillating share pressure power, share body steering, row sensors, axles, hopper fill level, cleaning speeds, power, row width, number, working width, lifter position and individual share depth states and can be used to change the position of the bushing, the sleeve and/or the retaining element and thus the support arm.

Furthermore, it is advantageous that measured values of a plurality of mounting devices are recorded, and the mounting devices can be controlled and adjusted individually or in groups. Advantages of the method according to the invention include:

Optimum guidance of the shares in the row, especially on slopes, in curves, or if soil conditions have changed.
Gentler lifting of the crops, optimum depth guidance.
Less soil pickup when lifting.
Better cleaning in the ploughshare.
Less soil contamination in the cleaning instruments.
Higher lifting capacity.
Less ground resistance.
Lower energy consumption.
Automatic adjustment to the beet tuber size.
More flexible use, sugar beets, chicory, fodder beet, etc.
Automatic adaptation to different ground conditions.

BRIEF DESCRIPTION OF THE DRAWINGS

The invention will be explained in more detail with reference to embodiments of the invention, which are illustrated in the drawings. In the drawings.

DETAILED DESCRIPTION OF THE DRAWINGS

Figure 1:
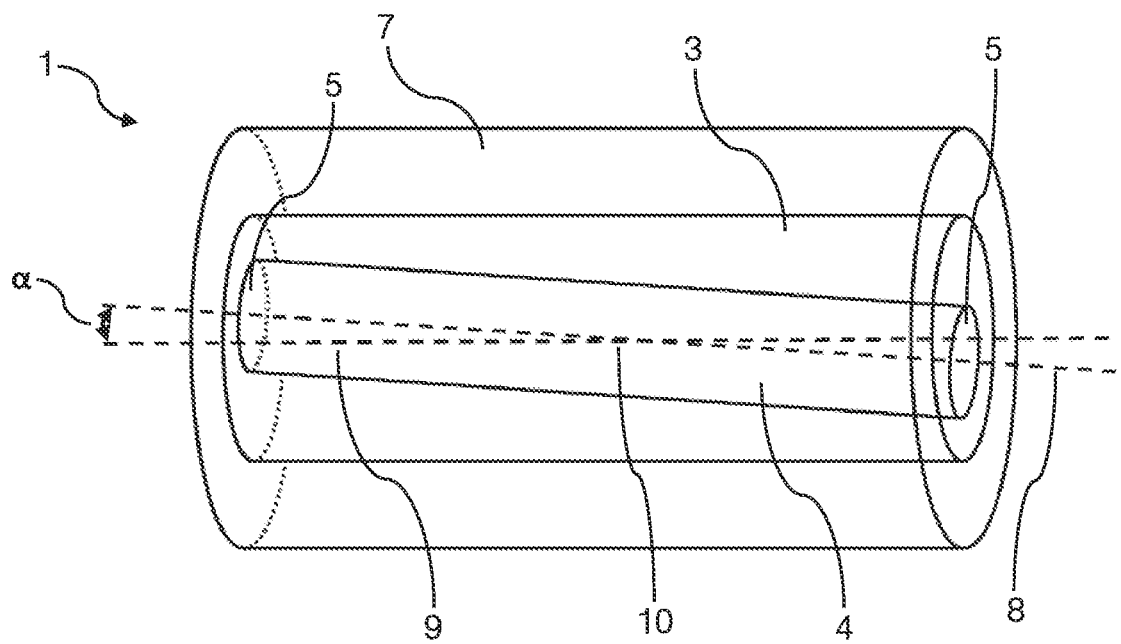
FIG. 1 is a schematic representation of an embodiment of the device according to the invention.
Figure 2:
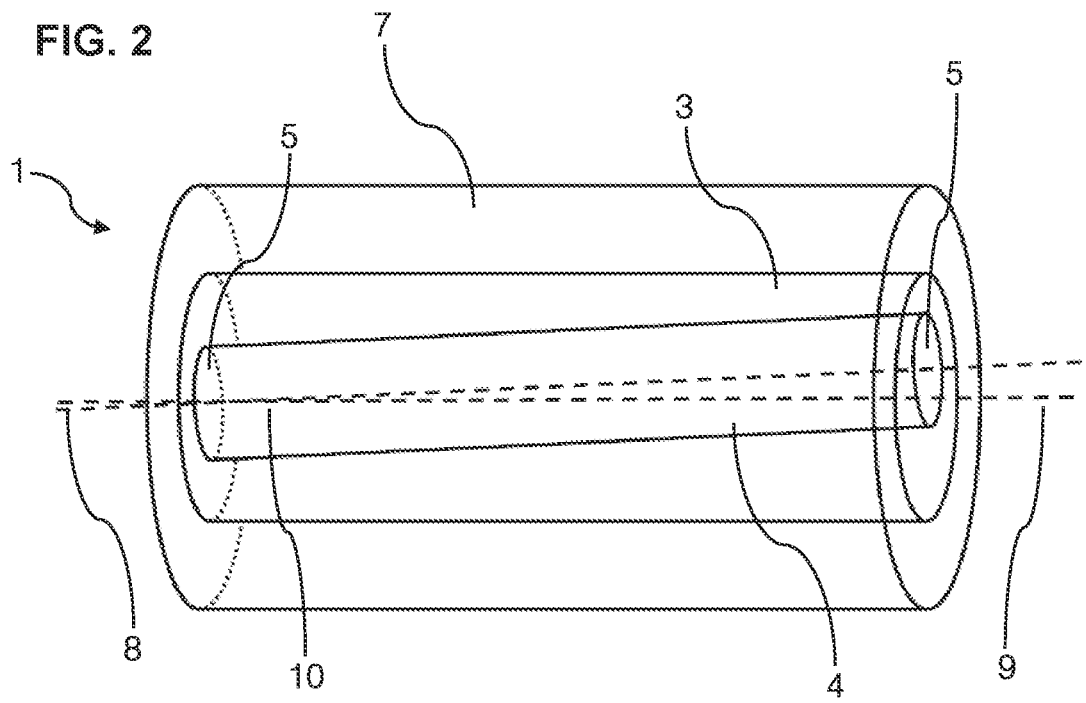
FIG. 2 is a schematic representation of a further embodiment.
Figure 3:
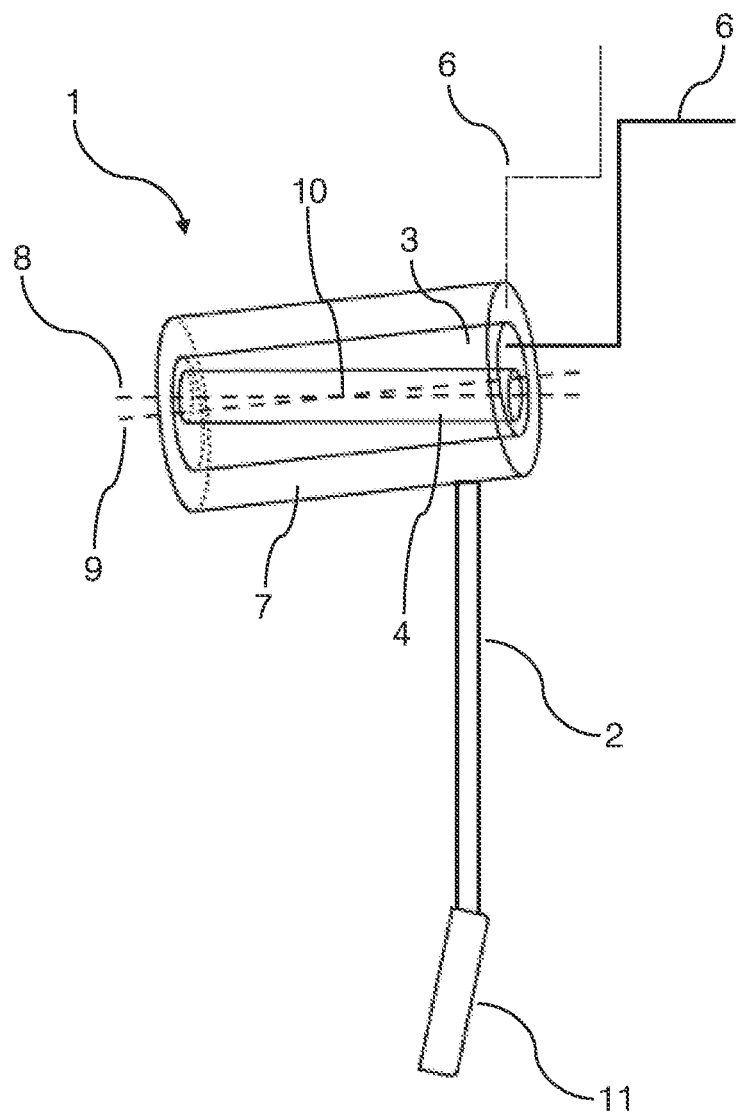
FIG. 3 shows a mounting device having a support arm and lifting tool.

FIGS. 1 and 2 show a mounting device 1 for mounting a support arm 2, FIG. 3 showing a further embodiment of a mounting device 1 having a support arm 2. The mounting device 1 comprises an inner cylindrical bushing 3 having a through-hole 4 that creates an opening 5 on two opposite sides of the bushing 3. A machine part (not shown), such as a supporting axle or a shaft, can be introduced into the through-hole 4. The bushing 3 can be connected to the shaft in a rotationally fixed manner.

The machine part serves to support the bushing and, if it is designed as a shaft, can drive it by connecting the bushing 3 to the shaft in a rotationally fixed manner. The bushing 3 is secured against displacement in the longitudinal direction of the machine part by means of safeguards (not shown), it being possible for the bushing 3 to be displaced with the aid of a manual or automatic displacement means. The bushing 3 is rotatably mounted in a sleeve-shaped retaining element 7, which is also cylindrical and can be mounted in an axially displaceable manner. Here, too, safeguards (not shown) serve to prevent unintentional displacement of the retaining element 7.

In FIG. 3, an adjustment means 6 designed as a lever is indicated with which a rotation of the bushing 3 can be achieved. The retaining element 7 can also be designed to be rotatable with an adjustment means 6 designed as a lever. The retaining element 7 can be part of a mobile frame (not shown) or be connected to one. The bushing 3 and the retaining element 7 can be made of a metal or a fibre composite material.

The through-hole 4 present in the bushing 3 and receiving the machine part has an axis of symmetry 8 extending eccentrically relative to the axis of rotation 9 of the cylindrical bushing 3. The axis of symmetry 8 of the through-hole 4 therefore does not extend coaxially relative to the axis of rotation 9 of the bushing 9. The axes are not congruent and can either extend in parallel offset to one another or at an angle a to one another. The through-hole 4 has two openings 5, the centres of which lie on the axis of symmetry 8 of the through-hole 4. However, it can also be provided that the through-hole 4 is designed to be eccentric at least in portions, and thus at least one centre point of the through-hole 4 does not lie on the axis of symmetry 8 of the through-hole 4.

The drawing shows an embodiment in which one of the centre points of the openings 5 is offset from the axis of rotation 9 of the cylindrical bushing 3. As can be seen from FIGS. 1 and 2, the through-hole 4 can be introduced into the bushing 3 at the angle α. The axis of symmetry 8 of the through-hole 4 intersects the axis of rotation 9 of the cylindrical bushing 3 at an intersection point 10. The through-hole 4 can be arranged in the bushing 3 in such a way that the intersection point 10 lies in a centre plane of the bushing 3 perpendicular to the axis of rotation 9 or outside thereof. Depending on the angle a at which the through-hole 4 is introduced, the intersection point 10 shifts out of the centre plane. An acute angle a is shown by way of example in the drawing. However, another angle can also be provided that is selected such that the axis of symmetry 8 of the through-hole 4 is not aligned parallel to the axis of rotation 9, because otherwise no intersection point 10 would arise.

As indicated schematically in FIG. 3, a lifting tool 11 is attached to the free end of the support arm 2. The support arm 2 can be fixedly attached to the retaining element 7 and guided or even supported in its movement by guide elements. Such guide elements can be, for example, joints, bearings or other components that guide and possibly support a movement of the support arm 2. A supporting component can be, for example, a drive that engages the support arm 2 and transmits an oscillating movement to the support arm 2 and consequently to the lifting tool 11. The lifting tool 11 can be a digging instrument such as a ploughshare, a wheel ploughshare or a polder share, with the help of which root crops such as beets, chicory, beetroot or potatoes are lifted out of the ground.

If the mounting device 1 is used in a harvesting machine that does not have its own drive unit, and the harvesting machine is pulled by an agricultural machine, for example a tractor, the oscillating movement of the lifting tool 11 can take place via a power take-off. The position of the support arm 2 can also be rotated via a power take-off that acts on the adjustment means 6, for example. The harvesting machine can, however, also be designed to be self-propelled and have its own drive, which in turn can be used to move the lifting tool 11 and for an oscillating function.

If root crops are to be harvested using the harvesting machine, after the penetration depth of the lifting tool 11 has been determined, the lifting tool 11 is adjusted accordingly by, for example, moving the bushing 3 axially via the adjustment means 6. Alternatively, the retaining element 7 can be moved or rotated axially, which is indicated in FIG. 3 by the dashed line identified by the reference sign 6. The movement or rotation causes the lifting tool 11 to be adjusted in different spatial directions at the same time. On the one hand, the support arm 2 and the lifting tool 11 attached thereto move in an elliptical or circular path transversely to the axis of rotation 9, i.e. in an up and down movement. On the other hand, the support arm 2 is moved in a pendulum movement in the axial direction along the axis of rotation 9. In addition, the lifting tool 11 can perform a back and forth movement perpendicular to the plane of the drawing in FIG. 3. In the event of such tilting, the position of the shares relative to the ground, i.e. the angle at which the shares are relative to the ground, is changed.

If root crops that are not precisely in a row or have grown crookedly require a displacement of the support arm 2, this is possible by displaceably mounting the retaining element 7 relative to the bushing 3 by means of a displacement means that can engage the retaining means. However, it can also be provided that the support arm 2 itself can be displaced on the retaining element 7 or be locked in different steps. The return of the retaining element 7 to a neutral central position in which the support arm 2 lies in a plane with the intersection point 10 can be achieved via a return spring. The displacement or adjustment of the position of the support arm 2 by means of the adjustment means 6 or the displacement means can be done manually or automatically using a control and regulation device that can be controlled by a farmer from the driver's cab and that receives data from sensors, for example. The adjustment or displacement can take place, for example, electrically, pneumatically or hydraulically or a combination thereof. Depth guidance, which controls the entry depth of the lifting tool 11 via sensors, such as optical sensors, sensing wheels, or electro-hydraulically via the control and regulation device, can be provided for the lifting tool 11. In addition, the lifting tool 11 can automatically be controlled from the side by arranging mechanical buttons on the frame, such as leaf or root crop buttons, which transmit control pulses to hydraulic lateral displacement or to an automatic steering system.

A plurality of support arms 2 having lifting tools 11 can be attached to the retaining element 7, the lifting tools 11 being able to run in a phase-shifted manner, which in turn is achieved by the design of the mounting device according to the invention. Regardless of whether a support arm 2 has a plurality of lifting tools 11 or the harvesting machine comprises a plurality of mounting devices 1, each having a support arm 2, the support arms 2 can be mounted in a laterally displaceable manner, which can be achieved by a displaceable bushing 3 or a displaceable retaining element 7 or by a displaceable support arm 2. This allows the position of the lifting tools 11 to be easily adapted to the respective position of the root crops.

An additional oscillating movement of the support arms 2 or lifting tools 11 can be achieved with the aid of an oscillating device that is operatively connected to the support arm 2, for example. The oscillating movement leads to a pre-cleaning of the lifted root crops and the removal of soil.

The digging instrument can in particular be designed as ploughshares, for example polder shares or wheel ploughshares. Polder shares, also known as oscillating or winged shares, are in particular wing-shaped plates arranged in pairs that are moved simultaneously or in a phase-shifted manner with the aid of the mounting device 1, a support arm having a share being attached to a retaining element 7 in each case. The pairs of ploughshares can be individually height-adjustable by adjusting the positions of the mounting devices 1 relative to one another. This even allows the height difference between individual rows (tracks or furrows) to be compensated for. The pair of shares can be arranged in an oblique V-shape, with the tip pointing downwards to the rear. The root crop is pushed upwards by the forward movement of the lifting tool 11 and freed from soil by means of an oscillating movement. The crop can then be moved into storage by a conveyor device. The root crop can, however, remain in the field and be collected by a separate agricultural machine.

Figure 4:
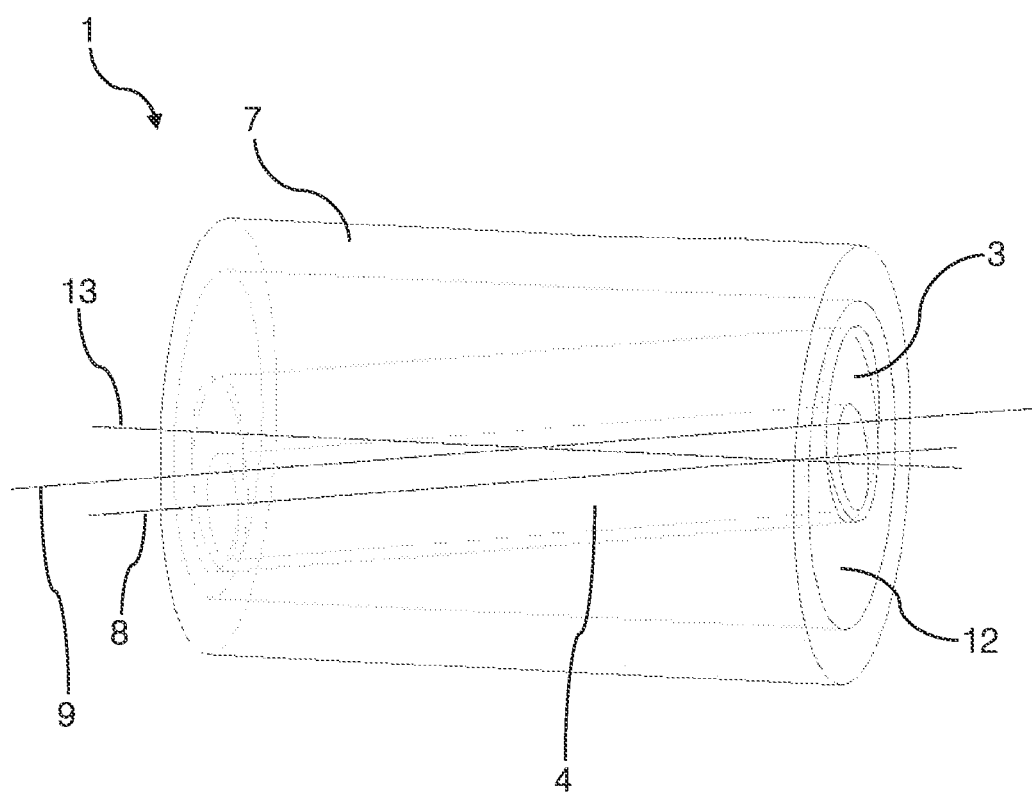
FIG. 4 shows a further embodiment of the mounting device.

FIG. 4 shows a further embodiment of a mounting device. It can be provided that a sleeve 12 surrounding the bushing 3 is present between the bushing 3 and the retaining element 7. The sleeve 12, the bushing 3 and/or the retaining element 7 can be adjusted or displaced relative to one another or independently of one another and relative to the machine part, such that pendulum movements and oscillating movements of the support arm or the lifting tool can be achieved. The axis of symmetry 8 of the through-hole 4 extends eccentrically relative to the axis of rotation 9 of the bushing 3 and is arranged slightly offset in parallel thereto. However, it can also be provided that the axis of symmetry 8 of the through-hole 4 is arranged at an angle a to the axis of rotation 9 of the bushing 3. Both axes 8, 9 extend eccentrically relative to the axis 13 of the retaining element 7 or the sleeve 12 and are arranged either parallel or at an angle a thereto. Depending on the arrangement of the through-hole 4, the bushing 3 and the sleeve 12 or the retaining element 7 and, consequently, their axes 8, 9, 13 relative to one another, the axes 8, 9 intersect the axis 13 of the retaining element 7 either together at one point or at two points spaced apart.

What is claimed is:

1. A harvesting machine for harvesting root crops comprising:
   a support arm,
   a mobile frame,
   a mounting device mounting the support arm, and
   a lifting tool that is movably mounted on the mounting device via the support arm,
   wherein the mounting device has a retaining element and a cylindrical bushing that is enclosed by the retaining element and that is mounted on a machine part of the harvesting machine,
   wherein an end of the support arm opposite the lifting tool is fixed on the retaining element,
   wherein the cylindrical bushing has an axis of rotation and a through-hole receiving the machine part,
   wherein the through-hole has an axis of symmetry extending eccentrically relative to the axis of rotation of the cylindrical bushing, the axis of symmetry extending at a non-zero angle to the axis of rotation and intersecting said axis of rotation at an intersection point.

2. The harvesting machine according to claim 1, wherein the through-hole has two openings and at least one center of an opening is arranged offset to the axis of rotation of the cylindrical bushing.

3. The harvesting machine according to claim 1, wherein the machine part is a supporting component or a shaft driving the cylindrical bushing.

4. The harvesting machine according to claim 1, further comprising a sleeve surrounding the cylindrical bushing and arranged between the cylindrical bushing and the retaining element.

5. The harvesting machine according to claim 1, wherein the retaining element is mounted in an axially displaceable manner on the cylindrical bushing.

6. The harvesting machine according to claim 1, further comprising a sleeve is mounted displaceably on the cylindrical bushing.

7. The harvesting machine according to claim 1, wherein the cylindrical bushing is mounted in an axially displaceable manner on the machine part.

8. The harvesting machine according to claim 1, wherein a means of displacement that axially displaces the retaining element and/or the cylindrical bushing is fixed on the retaining element and/or the cylindrical bushing.

9. The harvesting machine according to claim 1, wherein an adjustment means rotating the cylindrical bushing and/or the retaining element is arranged on the cylindrical bushing and/or the retaining element.

10. The harvesting machine according to claim 1, further comprising a further support arm mounted on the retaining element and a further lifting tool that is movably mounted on the mounting device via the further support arm, and the support arm and the further support arm are rotatable relative to each other in their mounts and thus movements of the lifting tool and the further lifting tool are adjustable relative to each other or in the same direction.

11. The harvesting machine according to claim 1, wherein an alignment of the retaining element on the cylindrical bushing and/or a positioning of the cylindrical bushing on the machine part can be adjusted manually or automatically.

12. The harvesting machine according to claim 1, further comprising a tool for removing heads from the root crops.

13. The harvesting machine according to claim 1, further comprising a tool for picking up and further processing the root crops lifted up by the lifting tool.

14. The harvesting machine according to claim 1, wherein the harvesting machine comprises a plurality of mounting devices and a plurality of support arms, each support arm having a lifting tool arranged on each mounting device.

\* \* \* \* \*

UNITED STATES PATENT AND TRADEMARK OFFICE
CERTIFICATE OF CORRECTION

| | | |
|---|---|---|
| PATENT NO. | : 12,035,652 B2 | Page 1 of 1 |
| APPLICATION NO. | : 17/335282 | |
| DATED | : July 16, 2024 | |
| INVENTOR(S) | : Andreas Reichhardt | |

It is certified that error appears in the above-identified patent and that said Letters Patent is hereby corrected as shown below:

In the Claims

In Claim 6, Line 2 (Column 9, Line 12): after "sleeve" please delete "is"

Signed and Sealed this
Thirteenth Day of August, 2024

Katherine Kelly Vidal
*Director of the United States Patent and Trademark Office*